US006966427B2

(12) United States Patent
Kilibarda

(10) Patent No.: US 6,966,427 B2
(45) Date of Patent: Nov. 22, 2005

(54) PALLET/SKID POWER ROLL SYSTEM

(75) Inventor: Velibor Kilibarda, Birmingham, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/407,600

(22) Filed: Apr. 4, 2003

(65) Prior Publication Data

US 2004/0195077 A1 Oct. 7, 2004

(51) Int. Cl.[7] .............................................. B65G 29/00
(52) U.S. Cl. ............................ 198/465.4; 198/781.05; 198/788; 198/790; 414/416.05
(58) Field of Search ............................ 198/465.1, 780, 198/781.03, 781.05, 788, 790; 414/404, 416.05, 414/416.07

(56) References Cited

U.S. PATENT DOCUMENTS 3,844,428 A * 10/1974 Olsen ......................... 414/280
4,006,810 A * 2/1977 Kornylak ..................... 193/37
4,077,590 A * 3/1978 Shorey ........................ 410/77
4,498,397 A * 2/1985 Fuchs et al. .................. 104/35
5,011,126 A * 4/1991 Suzuki et al. ............... 271/227
5,101,960 A * 4/1992 Simons ................ 198/457.07
5,118,243 A * 6/1992 Huebner et al. ............ 414/404
5,316,242 A * 5/1994 Eilenstein-Wiegmann et al. ....................... 244/137.1
5,352,085 A * 10/1994 Sargent et al. .............. 414/796
5,842,827 A * 12/1998 Kwasniewski et al. ..... 414/802
5,882,174 A * 3/1999 Woerner et al. ......... 414/788.7
6,045,324 A * 4/2000 Redman .................. 414/795.3
6,074,163 A * 6/2000 Yamazaki et al. ....... 414/795.5
6,269,941 B1 * 8/2001 Ueno ......................... 198/782
6,325,199 B1 * 12/2001 Becherucci et al. ..... 198/345.3
6,419,071 B1 * 7/2002 Oldford et al. .......... 198/345.3

FOREIGN PATENT DOCUMENTS

FR 2263176 * 10/1975

* cited by examiner

*Primary Examiner*—Douglas Hess
(74) *Attorney, Agent, or Firm*—Young & Basile, P.C.

(57) ABSTRACT

An apparatus moves a plurality of transport media along a path of travel. The plurality of transport media define at least two groups of transport media, where each group of transport media has substantially identical transverse dimensions with respect to one another within one group of transport media, while having substantially different transverse dimensions with respect to another group of transport media. The apparatus includes a plurality of rollers rotatably mounted in fixed locations spaced along a path of travel. At least one motor is provided for driving at least one of the rollers in rotation. At least one transport media is supported on the rollers for movement along the path of travel in response to rotation of the roller by the motor. Each transport media has at least one elongate support member continuously engageable with at least two rollers simultaneously while the transport media moves along the path of travel. A lift workstation can be located along the path of travel for transferring a workpiece carried by one transport media to another transport media.

20 Claims, 8 Drawing Sheets

46 72 66 68 52 70 62 60 60 54 60 60 56 64 60 60 28 16 26 18 10 24 12 60 62 58

PALLET/SKID POWER ROLL SYSTEM

RELATED APPLICATIONS

This application is related to a contemporaneously filed application entitled TRANSFER MEDIA LIFT EXCHANGE SYSTEM identified as Ser. No. 10/407,497.

FIELD OF THE INVENTION

The present invention relates to a combination power roll transport system for both skids and pallets, and to a transfer media lift exchange system positionable on opposite longitudinal sides of a combined skid/pallet power roll system.

BACKGROUND OF THE INVENTION

A pallet can be defined as a precision locating transfer media, such as a geometry fixture, while a skid can be defined as a simple frame structure transport media not requiring position locating of the workpiece with respect to the workstation. By way of example and not limitation, a simple skid frame can be used for supporting a welded automotive body for transport through the body undercoating process, while a precision geometry fixture pallet can be provided for positioning the floor pan, side panels, and roof panels with respect to one another at a welding station location. It would be desirable to provide an apparatus and method for transporting pallets and skids along a common portion of an assembly line. It would be desirable to provide an apparatus and method for lifting a workpiece from one transport media in order to place the workpiece on a different transport media.

SUMMARY OF THE INVENTION

A combined skid/pallet power roll system according to the present invention can include a longitudinally extended or enlarged roller having outwardly extending flanges at each end to allow the power roll drive system to handle either precision geometry fixture pallets or transportation skids on the same system. The power roll system according to the present invention can handle intermixed pallets and skids as required for the particular assembly line.

A transfer media lift exchange system according to the present invention can include first and second vertically extending elevators or lifts positioned on opposite longitudinal sides of the combined skid/pallet power roll system. According to the present invention, the physical structure of the vertically extending elevator or lift is powered in synchronized movement with belts extending preferably from a single drive unit. The lifts on the opposite sides of the power roll conveyor system allow the elevator to engage and lift a workpiece being conveyed by a skid, pallet, electric monorail system, or versaroll overhead conveyor. Once the workpiece is lifted from the current transport media, the current transport media can be removed from the workstation and a different transport media can be positioned at the workstation for receiving the workpiece from the elevator or lift assembly. The new transport media can include a different skid, pallet, electric monorail system, or versaroll overhead conveyor as required for the particular application. In the preferred configuration, the combined pallet/skid power roll system allows skids and pallets to be transported through the elevator workstation allowing the workpiece to be lifted from one skid or pallet for placement on a different pallet or skid as required for processing operations downstream of the transport media lift exchange system.

The present invention can include a "flow through" process configuration, where a pallet can be positioned along a pallet transfer system which transitions into the combined pallet/skid power roll system passing through the elevator workstation. A workpiece carried by the pallet is lifted from the pallet, and the pallet continues on through and transfers back to a pallet transfer system from the combined power roll system. A skid transfer system transitions to the same combined pallet/skid power roll system for delivering the skid to the elevator workstation, where the workpiece has been held after discharging the pallet. The workpiece is then lowered to deliver the workpiece to the skid. The skid then travels out of the elevator workstation and transitions back to a skid transport system.

Alternatively, the present invention can include an "in/out" process configuration, where a skid can deliver a workpiece to the elevator workstation, and the combined skid/pallet power roll system is positioned to receive either skids or pallets. The workpiece carried by skid is lifted from the skid and the skid is removed from the elevator workstation by reversing the direction of travel to return to the skid conveyor system. A pallet can then be delivered by a pallet conveyor system to the combined skid/pallet power roll system at the elevator workstation. The empty pallet can receive the workpiece by the lift assemblies of the elevator being lowered. The loaded pallet can then be removed from the elevator workstation by reversing the direction of travel for further movement along the pallet conveyor system.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
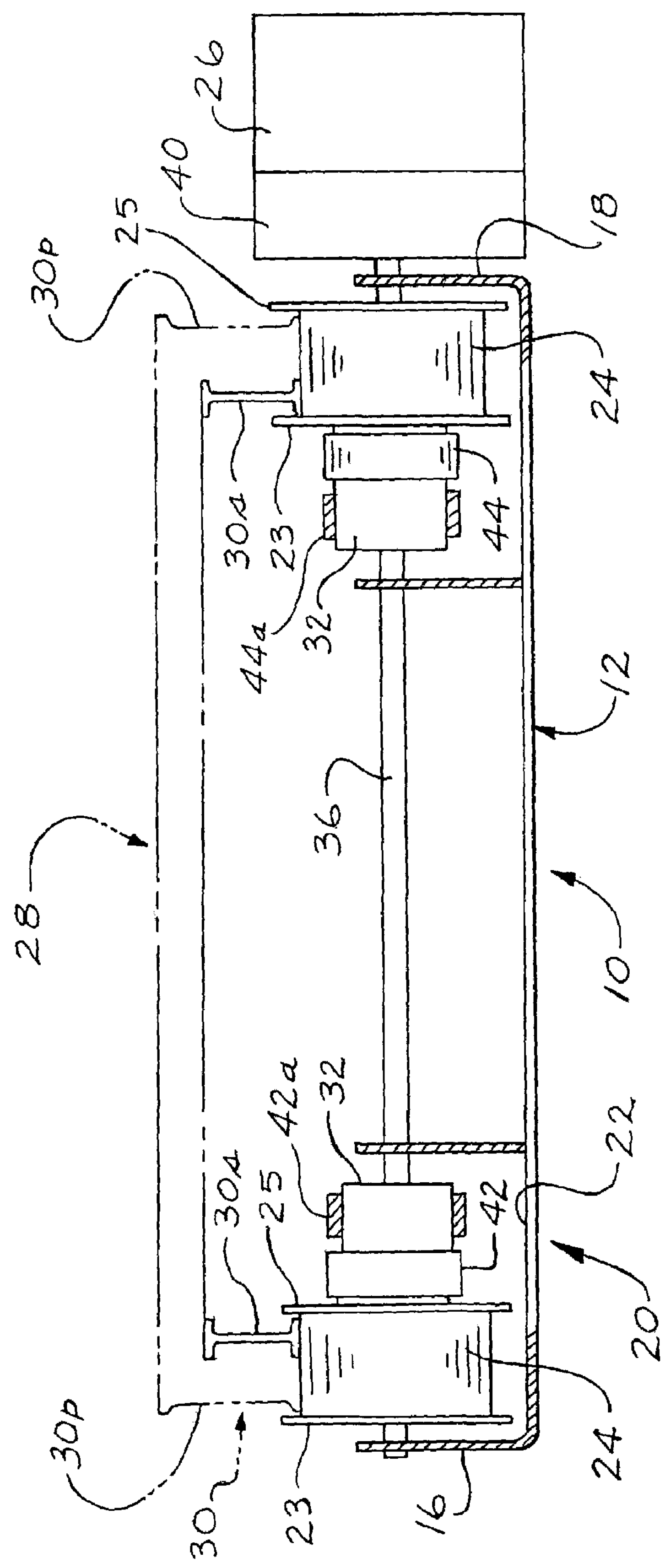
FIG. 1 is a simplified schematic view of a power roll conveyor according to the present invention with enlarged rollers of sufficient longitudinal length to operably engage both pallets and skids having different transverse dimensions with respect to the path of travel along the conveyor.
Figure 2:
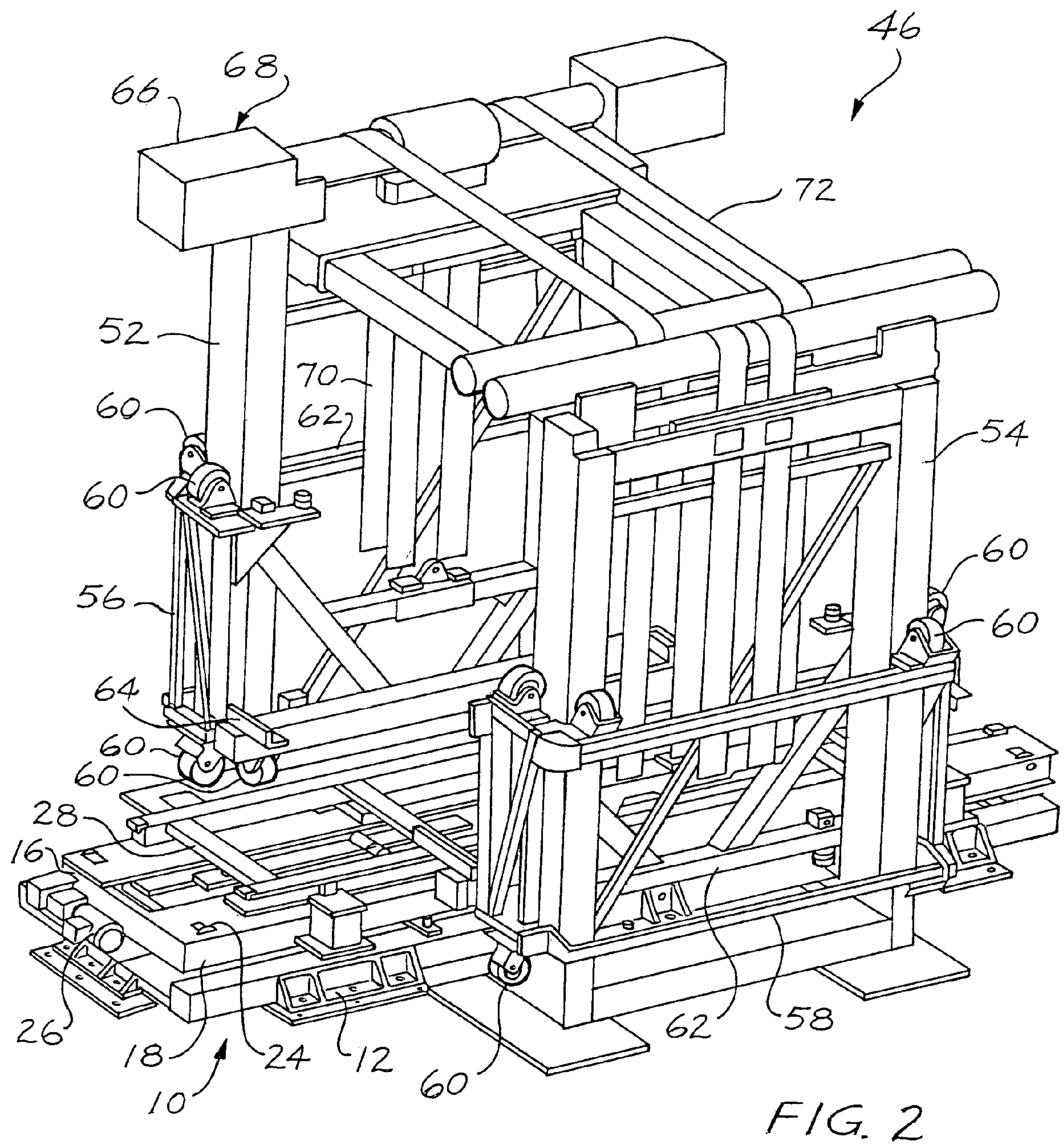
FIG. 2 is a simplified perspective view of an elevator or lift workstation capable of transferring workpieces between different transport media.

Referring now to FIG. 1, a simplified cross-sectional view of a pallet/skid power roll system 10 according to the present invention is illustrated. The pallet/skid power roll system 10 can include a support frame 12 of any configuration suitable for supporting the loads to be transported along the path of travel and allowing sufficient clearance for the workpieces to be processed. Suitable support frame structures are conventional and well known to those skilled in the art. The frame 12 can define at least two opposing sidewalls 16, 18 forming a channel or slot therebetween. The opposing sidewalls 16, 18 can be part of U-shaped channel 20 having a lower wall 22 extending between the opposing walls 16, 18 to define an open upper end extending along the entire longitudinal length of the U-shaped channel 20. The U-shaped channel 20 can define a path of travel for the pallet/skid power roll system 10. A plurality of rollers 24 are rotatably mounted in fixed locations spaced along the path of travel. At least one motor 26 is provided for driving at least a portion of the plurality of rollers 24 in rotation. The transport media 28, such as a pallet and/or a skid, is supported on the plurality of rollers 24 for movement along the path of travel in response to rotation of the driven rollers 24 by the motor 26. Each transport media 28 has at least one elongate support member 30 extending along at least a portion of the longitudinal length of the transport media 30 between the upstream end and the downstream end of the transport media 30. The at least one elongate support member 30 is continuously engagable with at least two rollers 24 simultaneously while the supported transport media 28 moves along the path of travel. Typically, if the transport media 28 is a geometry fixture pallet, a pair of transversely spaced support members 30 are continuously engagable with transversely spaced rollers 24 driven by the motor 26. The transverse spacing of the two transversely spaced elongate support members **30*p* of the pallet are typically further apart then the transverse spacing of the two elongate support members 30*s* of a corresponding transport skid. The plurality of rollers 24 are elongated along the longitudinal axis of rotation to support the corresponding elongate support members 30*p*, 30*s* in order to allow powered movement of pallets and/or skids along the power roll system 10. Each roller 24 includes outer enlarged ends or flanges 23, 25 to help maintain the transport media 28 in a centered position with respect to the path of travel along the power roll system 10**.

Figure 8:
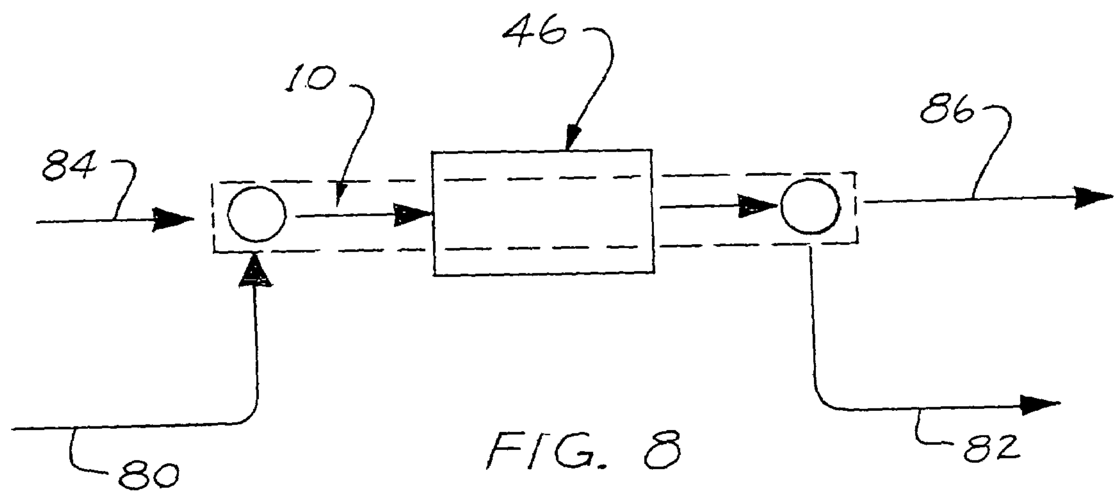
FIG. 8 is a schematic flow diagram illustrating a flow through configuration of the lift workstation illustrated in FIGS. 2 through 7.

The plurality of rollers 24 of an individual frame 12 can be operably associated with respect to one another to rotate substantially in unison if desired. The power roll system 10 according to the present invention can include a plurality of belts **42, 42*a*, 44, 44*a* for operably associating adjacent rollers with respect to one another. It should be recognized that the plurality of belts can be replaced with a single belt, a chain, or any other suitable drive mechanism for rotating one or more of the rollers in response to rotation of the motor. The motor 26 can be either rotatable in a single direction for use in a pass through configuration as illustrated in FIG. 8, or can be a reversible motor for use with the in/out configuration illustrated in FIG. 9**.

Figure 3:
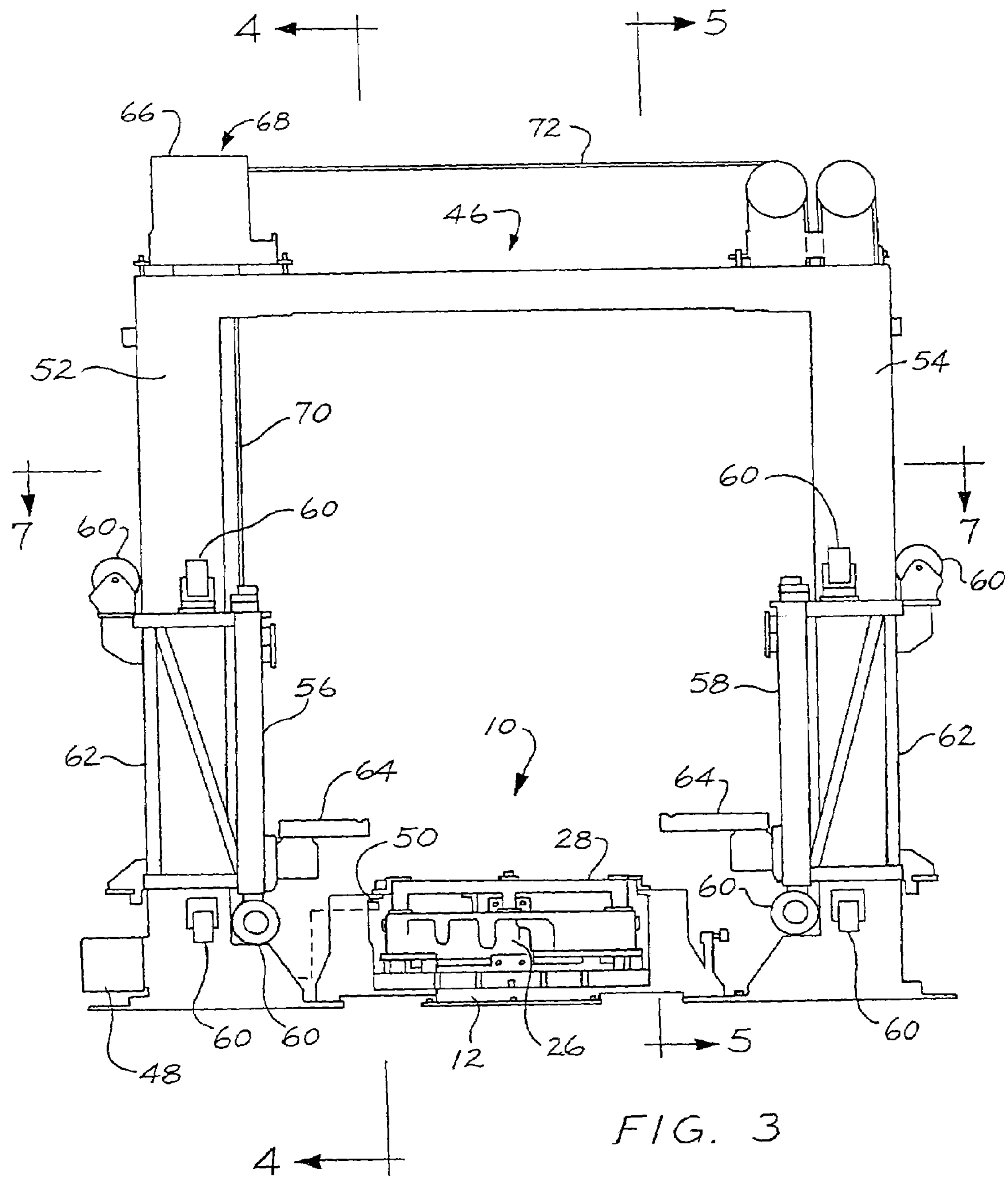
FIG. 3 is a side elevational view of the lift workstation illustrated in FIG. 2.
Figure 4:
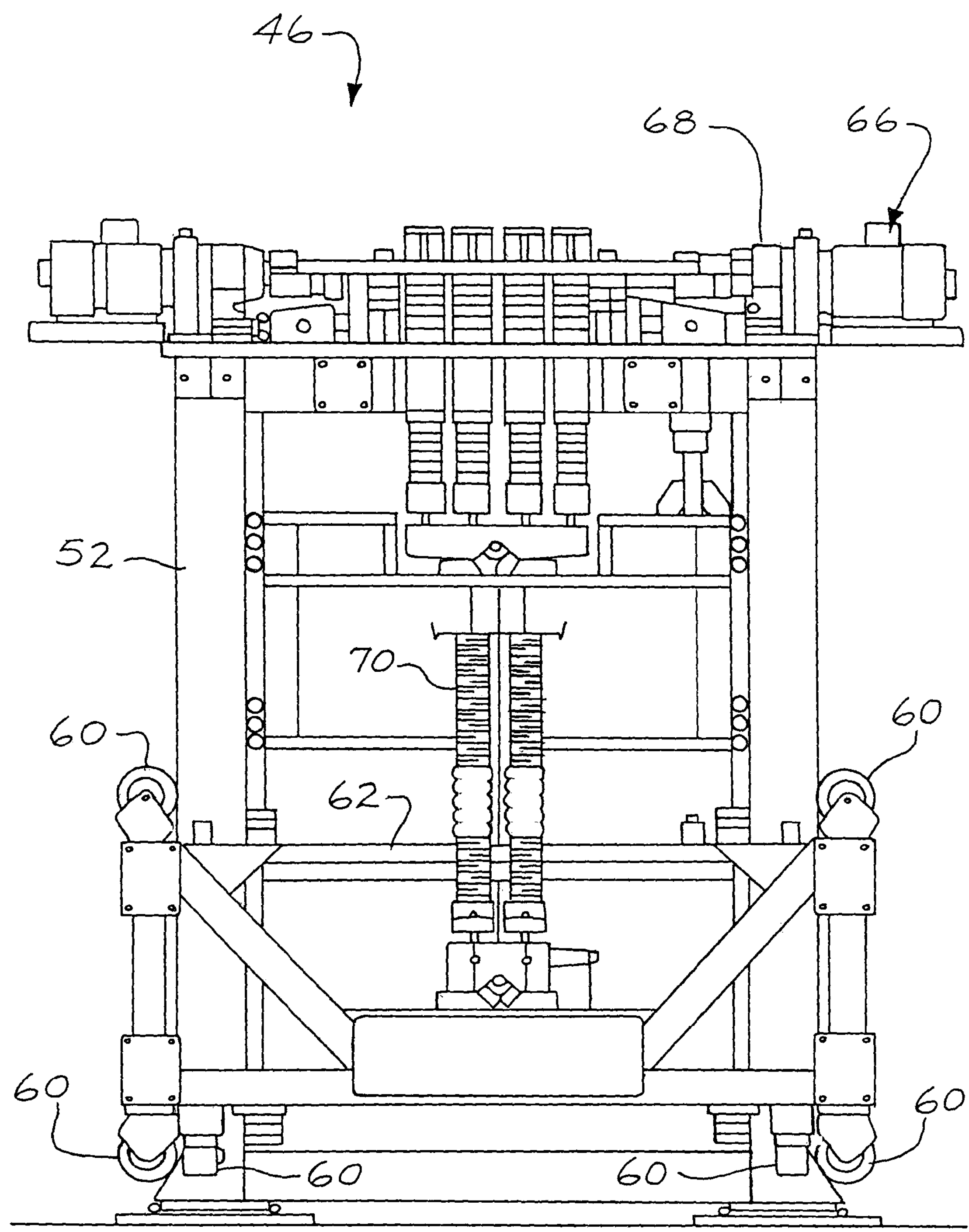
FIG. 4 is a cross-sectional view of a driven elevator portion of the lift workstation taken as shown in FIG. 3.
Figure 5:
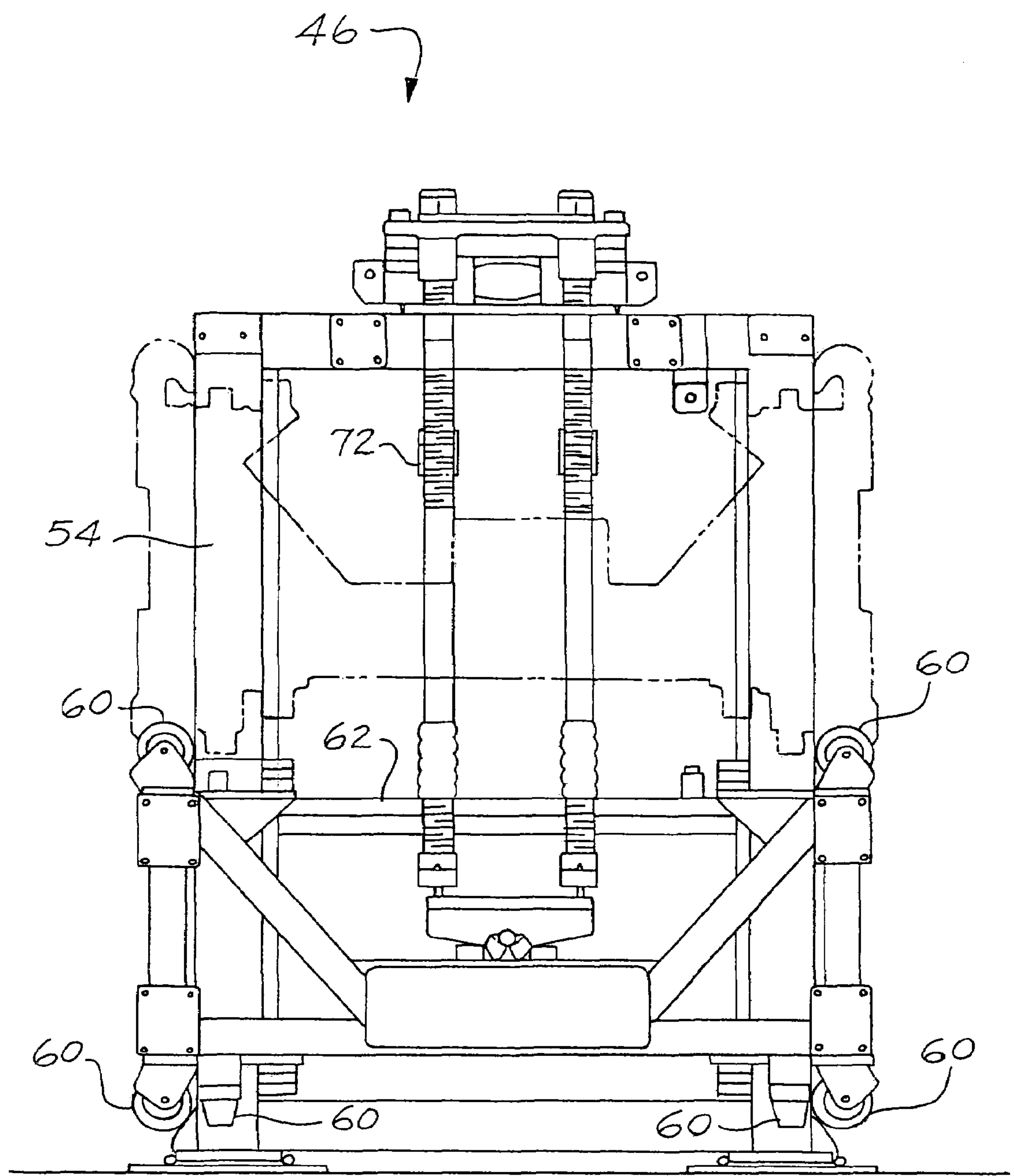
FIG. 5 is a cross-sectional view of an idle elevator portion of the lift workstation taken as shown in FIG. 3.
Figure 6:
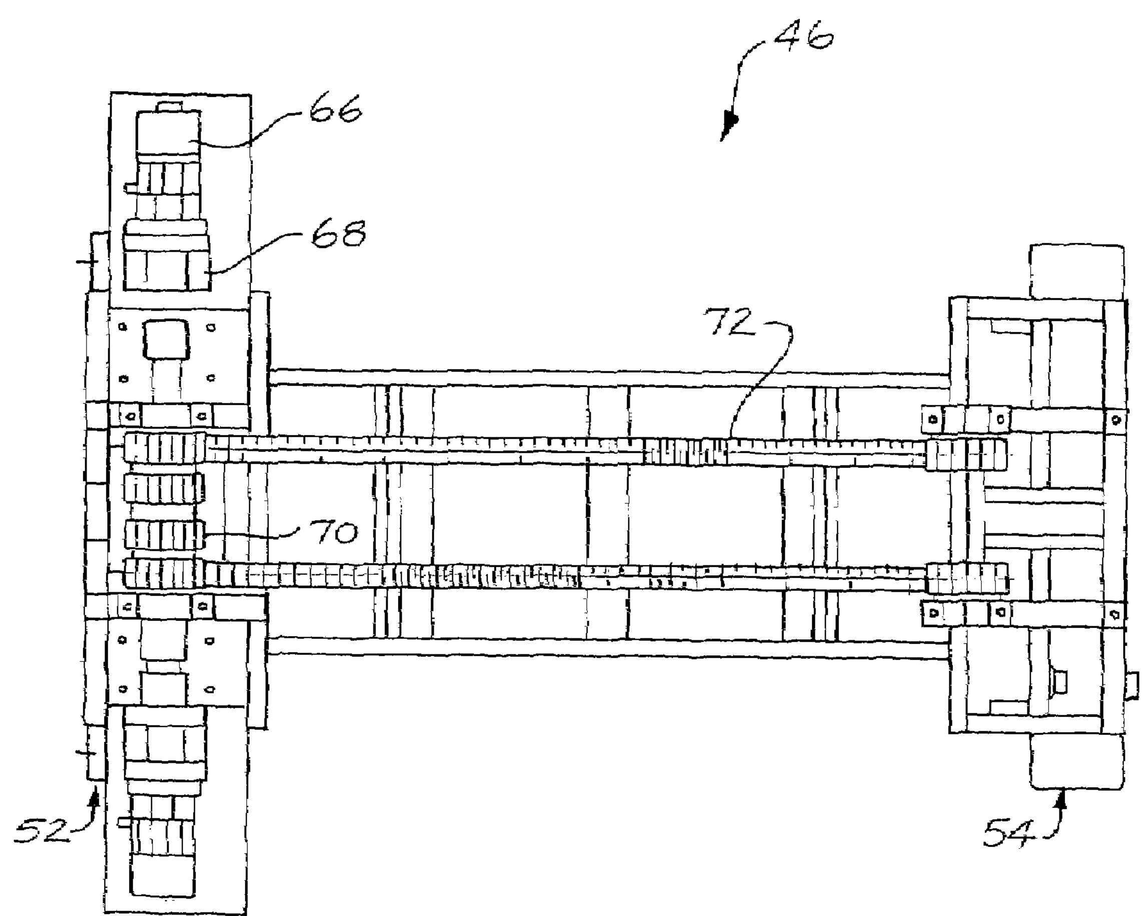
FIG. 6 is a plan view of the lift workstation illustrated in FIGS. 2 through 5.
Figure 7:
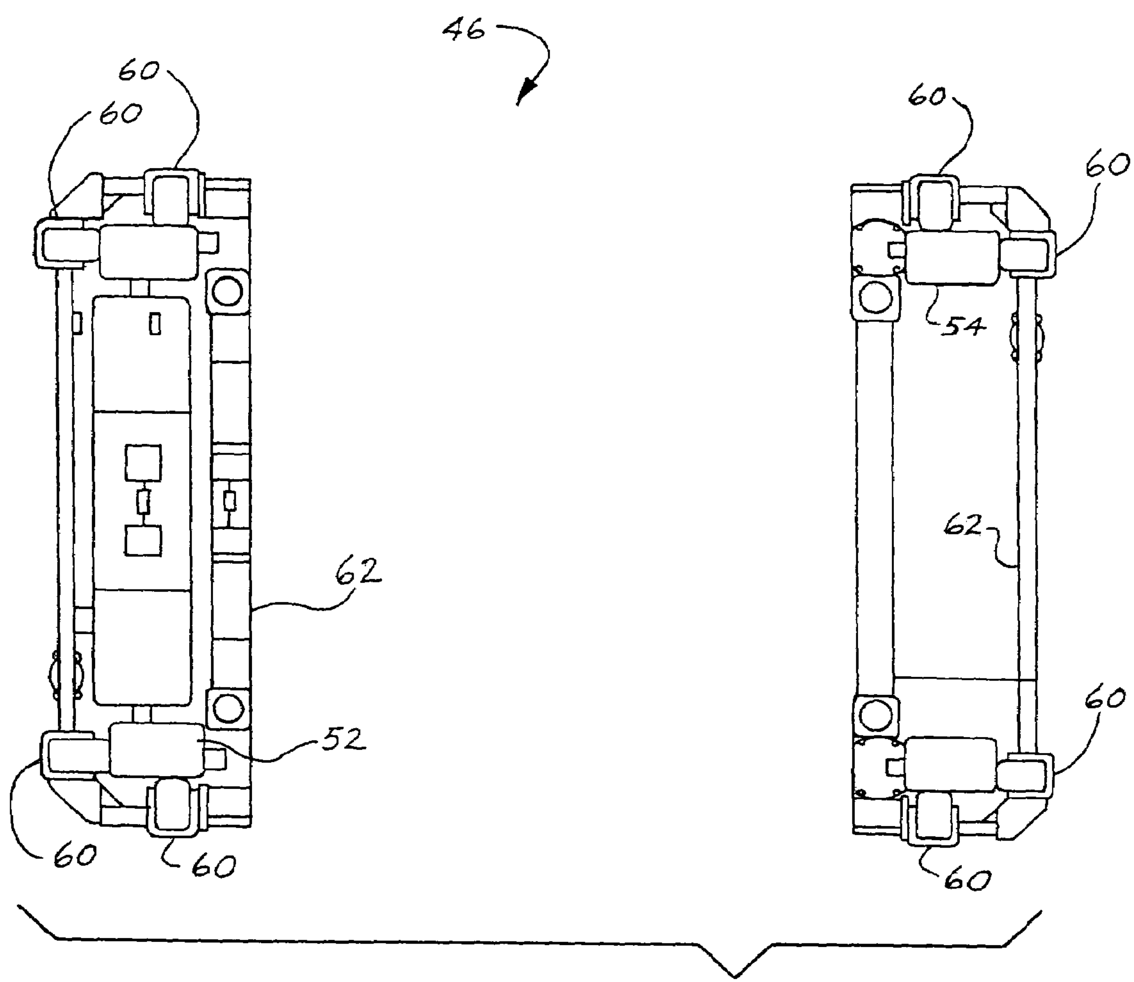
FIG. 7 is a cross-sectional view of the lift workstation taken as shown in FIG. 3.

Each roller 24 can be operably connected to a pulley 32 for rotation about an axis defined by shaft 36. Shaft 36 can be supported by opposing walls 16, 18 of the open top U-shaped channel 20. A cover can be provided for enclosing a substantial portion of the open top U-shaped channel 20 while allowing the upper portion of each roller 24 to extend through the cover for engagement with the elongate support members 30 of each transport media 28. The motor 26, through an appropriate gear box or transmission 40, drives at least one of the rollers 24. The first pulley 32 can be operably associated with a first drive belt 42. The first pulley 32 can be driven by the motor 26 and transfer rotational motion to an adjacent, second pulley spaced longitudinally from the first pulley with respect to the path of travel. A second drive belt can be extended from the second pulley for engagement with a third pulley spaced further longitudinally from the drive motor 26 than the second pulley. The series of interconnected first and second drive belts extend between adjacent roller assemblies to operably engage with corresponding drive pulleys to transfer the rotational motion of the motor 26 along at least a portion or segment of the path of travel of the power roll conveyor system 10 according to the present invention. Preferably, the motor 26 is a variable frequency reversible drive capable of transporting a transport media 28 at the desired speed when loaded with a workpiece to be conveyed along the path of travel. One or more motors 26 can be disposed along the longitudinal length of the path of travel for separate independent control of the transport media 28 as the transport media 28 moves between one or more workstations located along the path of travel. A lift workstation 46 can be provided along the path of travel of the power roll conveyor system 10. It should be recognized that the lift workstation 46 can be used in combination with a power roll conveyor system 10, and/or a pallet conveyor system, and/or a skid conveyor system, and/or an electric monorail conveyor system, and/or a versaroll overhead conveyor system such as that disclosed in U.S. patent application Ser. No. 10/225,291, filed Aug. 22, 2002 which is incorporated by reference herein in its entirety. The variable frequency drive motor 26 for this segment of the power roll conveyor system 10 can be controlled by a controller 48 schematically illustrated in FIG. 3 in response to one or more sensors 50. The sensors 50 can be positioned at floor level along with any control panel required for the controller 48 for ease of maintenance. The sensors 50 can be positioned adjacent the entry to the workstation 46 for signaling the controller 48 to slow the variable frequency drive motor 26 as the transport media 28 enters the workstation 46. Additional sensors can be appropriately positioned in order to accurately stop the transport media 28 at the desired position at the lift workstation 46.

The lift workstation 46 can best be seen in FIGS. 2 through 7. Each vertically extending side 52, 54 of the lift workstation 46 supports a corresponding vertically reciprocal lift carriage 56, 58. Each lift carriage 56, 58 includes a plurality of guide rollers 60 engagable with surfaces of the vertically extending sides 52, 54 for maintaining the orientation of the reciprocal lift carriages 56, 58 during movement between a raised position and a lowered position. Each lift carriage 56, 58 includes a rigid frame 62 supporting the guide rollers 60 and further supporting inwardly extending cantilevered lift arms 64. The lift arms 64 are capable of operably engaging a workpiece carried by the transport media 28 in order to lift the workpiece from one transport media 28 for delivery to another transport media to be delivered to the lift workstation 46.

In the illustrated configuration, by way of example and not limitation, one of the lift carriages is a driven elevator 56, while the other lift carriage is an idler elevator 58. A single lift motor 66 can be provided for lifting both the driven elevator 56 and idler elevator 58 through an appropriate gear box or transmission 68. The rotation of the lift motor 66 can be transferred to the driven elevator by one or more lift belts 70 while simultaneously being transferred to the idler elevator 58 by one or more belts 72. Movement of the idler lift belt 72 can occur either directly from engagement with the drive portion of the single lift motor 66, or can be operably connected through appropriate idler pulleys to move synchronously with the driven elevator in response to motion of the driven elevator by the single lift motor 66. A single drive motor is used in the preferred configuration in order to simplify the synchronous movement of opposite sides of the vertically reciprocal lift carriages 56, 58 in order to maintain the workpiece in a balance configuration without requiring complicated synchronization controls for multiple drive motors.

In operation, the controller 48 at the lift station 46 is signaled that a workpiece has been delivered by activation of sensor 50. When the workpiece is located at the ready position, the sensor 50 signals the controller 48, and the controller 48 actuates the single lift motor 66 to move the lift carriages 56, 58 simultaneously from the lowered position to the raised position in order to remove the workpiece from the transport media 28, such as a pallet, a skid, or an overhead carriage connected to an electric monorail system or versaroll overhead conveyor system. After reaching the raised position with the workpiece, the single lift motor 66 is stopped, and the transport media 28 is removed from the lift workstation 46. Another transport media 28, such as a pallet, a skid, or a carriage connected to an electric monorail conveyor system or versaroll overhead conveyor system, is delivered to the lift workstation 46. When the second transport media 28 had been delivered to the lift workstation 46, the sensor 50 signals the controller 48 to actuate reversal of the single lift motor 66 in order to lower the workpiece with the vertically reciprocal lift carriages 56, 58. When the lift carriages 56, 58 reach the lowered position, the workpiece is transferred to the new transport media 28 located at the lift workstation 46.

Referring now to FIG. 8, a pass through configuration for the vertical lift station 46 using the pallet/skid power roll system 10 according to the present invention is illustrated. In this configuration, a pallet or skid transport system 80 delivers a workpiece loaded on a pallet or skid to the workstation 46. The workpiece is removed from the pallet or skid at the lift workstation 46 as described in greater detail above. After the workpiece has been removed from the pallet or skid, the empty pallet or skid passes through the workstation and is transferred back to the return line of the pallet or skid transport system 82. An empty skid or pallet is delivered to the workstation 46 by a skid or pallet delivery system 84. The workpiece held by the raised lift carriages 56, 58 is lowered and the workpiece is transferred to the empty skid or pallet as described in greater detail above. After the workpiece has been loaded on the skid or pallet, the skid or pallet passes through the lift workstation 46 and continues to the loaded skid or pallet transport system 86.

Figure 9:
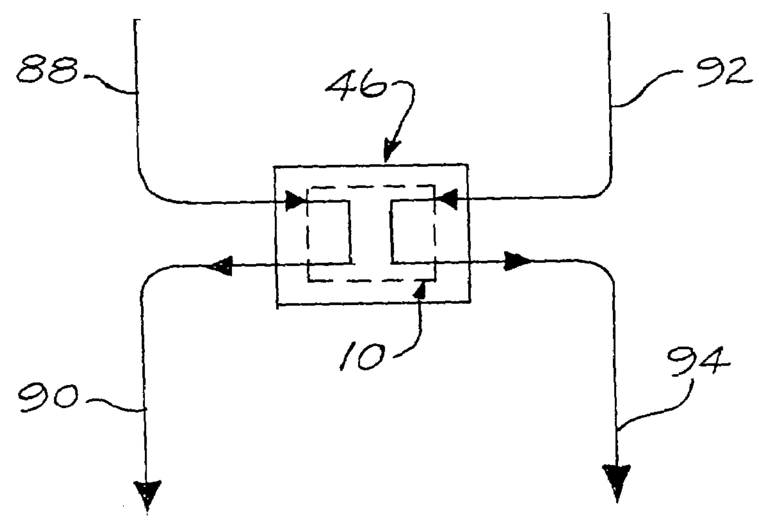
FIG. 9 is a simplified schematic diagram of an in/out process configuration for the lift workstation illustrated in FIGS. 2 through 7.

Referring now to FIG. 9, an alternative in/out configuration of the lift workstation 46 and pallet/skid power roll system 10 according to the present invention is schematically illustrated. In this configuration, the loaded skid or pallet is delivered to the workstation 46 by media transport system 88. At the left workstation 46, the lift carriages 56, 58 are raised in order to remove the workpiece from the loaded pallet or skid. The empty pallet or skid is then removed from the lift workstation 46 by reversing out of the workstation to continue along the pallet or skid transfer system 90. An empty skid or pallet is delivered to the workstation 46 by media transport system 92. The workpiece is loaded on the empty pallet or skid as described in greater detail above. The loaded pallet or skid is then reversed out of the workstation 46 for continue transportation on the pallet or skid transportation system 94.

It should be recognized that the pallet/skid power roll system and lift workstation disclosed according to the present invention can be used independently of one another, or in any desired combination in order to allow the flexible delivery and transfer from one transport media to another transport media. The delivering transport media can include a pallet, a skid, an overhead carriage, such as a carriage connected to an electric monorail system or versaroll overhead system. The removing transport media can include a different transport media or a similar transport media, and can be selected from a pallet, a skid, an overhead carriage, such as a carriage connected to an electric monorail system, or a versaroll overhead conveyor system. The present invention permits the transfer of workpieces from various transport media in a simple and efficient fashion. Further, the pallet/skid power roll system according to the present invention allows the delivery and removal of either pallets or skids along the same section of the conveyor system permitting simplified conversion from pallet delivery to skid delivery, or skid delivery to pallet delivery as required for the particular application.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for moving a plurality of transport media along a path of travel, the plurality of transport media defining at least two groups of transport media, each group of transport media having substantially identical transverse dimensions with respect to one another within one group of transport media, while having substantially different transverse dimensions with respect to another group of transport media, the apparatus comprising:

a plurality of rollers rotatably mounted in fixed locations spaced along a path of travel;

at least one motor for driving at least one of the rollers in rotation;

at least one transport media supportable on the rollers for movement along the path of travel in response to rotation of the roller by the motor, each transport media continuously engageable with at least two rollers simultaneously while the transport media moves along the path of travel;

each roller operably associated with a common shaft supporting a driven pulley and a driving pulley; and a plurality of elongate drive members engaged between adjacent rollers connecting the driven pulley of one roller with the driving pulley of an adjacent roller for transmitting rotation from the motor to the plurality of rollers along the path of travel.

2. The apparatus of claim 1 further comprising:

a frame for supporting the plurality of rollers operably engagable with the transport media for movement of the transport media along the path of travel.

3. The apparatus of claim 1 further comprising:

each roller of sufficient dimension to operably engage and support both groups of transport media for movement along the path of travel.

4. The apparatus of claim 1, wherein the plurality of rollers further comprise:

a first set of rollers rotatably driven to move the transport media along the path of travel; and a second set of rollers freely rotatable to support the transport media during movement along the path of travel.

5. The apparatus of claim 4, wherein a first roller of the first set of rollers and a second roller of the second set of rollers are positionable along a common axis extending transverse to the path of travel.

6. The apparatus of claim 1 further comprising:

at least one sensor for sensing a position of the transport media along the path of travel and for emitting a signal; and control means for receiving the signal from the at least one sensor and for controlling the motor rotating the plurality of rollers in response to the signal.

7. The apparatus of claim 1 further comprising:

means for moving the transport media between a first section of the path of travel and a second section of the path of travel, where the first and second sections of the path are at an angular, non-linear, orientation with respect to one another.

8. The apparatus of claim 1 further comprising:

a lift workstation located along the path of travel; and at least one sensor operably positionable for sensing the transport media when at the lift workstation for controlling movement of the transport media at the lift workstation as the transport media is driven along the path of travel by rotation of the plurality of rollers.

9. The apparatus of claim 1 further comprising:

a lift workstation located along the path of travel for transferring a workpiece carried by one transport media to another transport media.

10. The apparatus of claim 9, wherein the lift workstation further comprises:

at least two vertically extending frame members positioned on opposite sides of the path of travel at the lift workstation; and reciprocal means moveable vertically along the vertically extending frame members for lifting a workpiece from one transport media and for delivering the lifted workpiece to another transport media.

11. An apparatus for moving a plurality of transport media along a path of travel, the plurality of transport media defining at least two groups of transport media, each group of transport media having substantially identical transverse dimensions with respect to one another within one group of transport media, while having substantially different transverse dimensions with respect to another group of transport media, the apparatus comprising:

a plurality of rollers rotatably mounted in fixed locations spaced along a path of travel;

at least one motor for driving at least one of the rollers in rotation;

at least one transport media supportable on the rollers for movement along the path of travel in response to rotation of the roller by the motor, each transport media continuously engageable with at least two rollers simultaneously while the transport media moves along the path of travel; and a lift workstation located along the path of travel for transferring a workpiece carried by one transport media to another transport media, wherein the lift workstation includes at least two vertically extending frame members positioned on opposite sides of the path of travel at the lift workstation, and reciprocal means moveable vertically along the vertically extending frame members for lifting a workpiece from one transport media and for delivering the lifted workpiece to another transport media, wherein the reciprocal lifting means includes first and second elevators connected to the vertically extending frame members positioned on opposite sides of the path of travel at the lift workstation.

12. The apparatus of claim 11 further comprising:

a plurality of guide rollers supported on each of the first and second elevators for operable engagement with surfaces of the frame members for guiding reciprocal movement of the elevators between a lowered position and a raised position.

13. The apparatus of claim 12 further comprising:

at least one motor operably connected to the first and second elevators for moving the elevators between the lowered position and the raised position.

14. The apparatus of claim 13 further comprising:

at least one drive belt extending between the at least one motor and the first and second elevators for moving the elevators in response to operation of the motor.

15. The apparatus of claim 13 further comprising:

control means for operating the at least one motor in response to arrival and departure of transport media to the lift workstation; and a sensor for sensing whether a transport media is located in a ready position at the lift workstation, and for generating a signal corresponding to a sensed condition of the transport media.

16. The apparatus of claim 11, wherein the transport media is selected from a group consisting of a geometry fixture, a pallet, a skid, and an overhead carriage.

17. The apparatus of claim 11 further comprising:

each roller operably associated with a shaft; and a plurality of elongate drive members engaged between longitudinally spaced, adjacent rollers, each elongate drive member connecting one roller with an adjacent roller for transmitting rotation from the motor between the plurality of rollers along the path of travel.

18. The apparatus of claim 11 further comprising:

each roller of sufficient dimension to operably engage and support both groups of transport media for movement along the path of travel.

19. The apparatus of claim 11 further comprising:

means for moving the transport media between a first section of the path of travel and a second section of the path of travel, where the first and second sections of the path are at an angular, non-linear, orientation with respect to one another.

20. A method for moving a plurality of transport media along a path of travel, the plurality of transport media defining at least two groups of transport media, each group of transport media having substantially identical transverse dimensions with respect to one another within one group of transport media, while having substantially different transverse dimensions with respect to another group of transport media, the method comprising the steps of:

supporting at least one transport media on a plurality of rollers rotatably mounted in fixed locations spaced along a path of travel;

driving at least one of the rollers in rotation with at least one motor;

moving the at least one transport media supportable on the rollers along the path of travel in response to rotation of the roller by the motor, each transport media continuously engageable with at least two rollers simultaneously while the transport media moves along the path of travel;

delivering a workpiece to a lift station with a first transport media;

lifting the workpiece from the first transport media with reciprocal elevators;

reversing movement of the empty first transport media to remove the empty first transport media from the lift workstation;

delivering an empty second transport media to the lift workstation;

loading the lifted workpiece on the second transport media with the reciprocal elevators; and reversing movement of the loaded second transport media to remove the loaded second transport media from the lift workstation.

* * * * *

UNITED STATES PATENT AND TRADEMARK OFFICE

CERTIFICATE OF CORRECTION

PATENT NO. : 6,966,427 B2
APPLICATION NO. : 10/407600
DATED : November 22, 2005
INVENTOR(S) : Velibor Kilibarda It is certified that error appears in the above-identified patent and that said Letters Patent is hereby corrected as shown below:

Column 3, line 28: "transport media 30" should read --transport media 28--

Column 3, line 29-30: "transport media 30." should read --transport media 28.--

Column 5, line 29: "had" should read --has--

Column 5, line 58: "delivered to the workstation 46" should read --delivered to the lift workstation 46--

Column 5, line 59: "At the left workstation 46," should read --At the lift workstation 46,--

Signed and Sealed this

Second Day of October, 2007

JON W. DUDAS
*Director of the United States Patent and Trademark Office*